United States Patent
Mazzini et al.

(10) Patent No.: US 10,720,995 B1
(45) Date of Patent: Jul. 21, 2020

(54) UNEQUAL SPACING ON MULTILEVEL SIGNALS

(71) Applicant: Cisco Technology, Inc., San Jose, CA (US)

(72) Inventors: Marco Mazzini, Seville (ES); Christopher R. S. Fludger, Nuremberg (DE); Alberto Cervasio, Cuorgne' (IT); Matthew J. Traverso, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/547,389

(22) Filed: Aug. 21, 2019

(51) Int. Cl.
*H04B 10/2507* (2013.01)
*H04B 10/524* (2013.01)
*H04L 25/49* (2006.01)
*H04J 14/02* (2006.01)
*H04B 1/04* (2006.01)
*H04B 10/2513* (2013.01)
*H04B 10/516* (2013.01)
*H04B 10/54* (2013.01)
*H04B 10/079* (2013.01)

(52) U.S. Cl.
CPC ......... *H04B 10/524* (2013.01); *H04B 1/0475* (2013.01); *H04B 10/2507* (2013.01); *H04B 10/2513* (2013.01); *H04B 10/5161* (2013.01); *H04B 10/541* (2013.01); *H04J 14/0221* (2013.01); *H04L 25/4917* (2013.01); *H04B 10/0795* (2013.01)

(58) Field of Classification Search
None
See application file for complete search history.

(56) References Cited

U.S. PATENT DOCUMENTS

| | | | |
|---|---|---|---|
| 8,538,260 B2 | 9/2013 | Niven-Jenkins et al. | |
| 8,774,632 B2 | 7/2014 | Archambault | |
| 8,948,609 B2 * | 2/2015 | Whiteaway | H04L 27/364 398/182 |
| 9,184,841 B2 * | 11/2015 | Robinson | H04B 10/2507 |
| 10,020,886 B2 * | 7/2018 | Castro | H04B 10/2507 |

(Continued)

OTHER PUBLICATIONS

Echeverri-Chacon et al., Transmitter and Dispersion Eye Closure Quaternary (TDECQ) and Its Sensitivity to Impairments in PAM4 Waveforms, Feb. 2019 (Year: 2019).*

*Primary Examiner* — Jai M Lee
(74) *Attorney, Agent, or Firm* — Patterson + Sheridan, LLP

(57) ABSTRACT

The present disclosure provides signal management with unequal eye spacing by: sending, from a local transmitter, first and second signals with different first and second known eye patterns to a remote receiver over a channel; sending temperature data of the local transmitter and operating wavelength data of the first and second signals to the remote receiver over the channel; receiving, from the remote receiver, tuning parameters based on a dispersion of the channel based on a first difference between the first known eye pattern as transmitted and as received and a second difference between the second known eye pattern as transmitted and as received; and adjusting transmission rail values used to encode data for transmission over the channel by the local transmitter based on the tuning parameters to produce a conditioned signal for transmission with an unequally spaced eye pattern.

20 Claims, 7 Drawing Sheets

(56) References Cited

U.S. PATENT DOCUMENTS

| | | | | |
|---|---|---|---|---|
| 10,491,436 | B1* | 11/2019 | Lim | H03K 17/6872 |
| 2001/0048798 | A1* | 12/2001 | Sasaoka | H04B 10/25133 |
| | | | | 385/123 |
| 2003/0058496 | A1 | 3/2003 | Obeda et al. | |
| 2003/0231676 | A1* | 12/2003 | Buckman | H01S 5/042 |
| | | | | 372/38.02 |
| 2005/0111852 | A1* | 5/2005 | Mahgerefteh | G02B 5/281 |
| | | | | 398/187 |
| 2008/0101795 | A1* | 5/2008 | Schulz | H04B 10/0795 |
| | | | | 398/25 |
| 2015/0016495 | A1* | 1/2015 | Ranjan | H04L 1/248 |
| | | | | 375/227 |
| 2017/0346570 | A1* | 11/2017 | Teranishi | H04B 10/505 |
| 2018/0212712 | A1* | 7/2018 | Rope | H04L 1/0047 |
| 2018/0343064 | A1* | 11/2018 | Kawaai | H04B 10/516 |
| 2019/0312650 | A1* | 10/2019 | Spyropoulos | H04B 10/564 |
| 2019/0319712 | A1* | 10/2019 | Zhang | H04B 10/6161 |
| 2019/0342028 | A1* | 11/2019 | He | H04B 10/2507 |

* cited by examiner

UNEQUAL SPACING ON MULTILEVEL SIGNALS

TECHNICAL FIELD

Embodiments presented in this disclosure generally relate to signal processing. Particularly, the present disclosure provides for signal conditioning to overcome path effects in multiple wavelength signaling environments.

BACKGROUND

As communications platforms include ever greater bandwidth on existing channels, tradeoffs are made in the signal characteristics to accommodate the greater bandwidth. For example, Pulse Amplitude Modulation (PAM) divides available signaling space into several amplitude ranges to increase signaling bandwidth by having several potential values defined at several potential amplitudes rather than two values (e.g., 0 at minima and 1 at maxima), but the resilience of the signal to noise is reduced; effectively trading SNR (Signal to Noise Ratio) for bandwidth. As longer signaling channels may introduce more opportunities to introduce noise to the signal or cause the amplitude of the signal to decay over distance, and as users desire ever greater bandwidth, the operating conditions faced by transmitters and receivers demand greater attention to signal fidelity.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
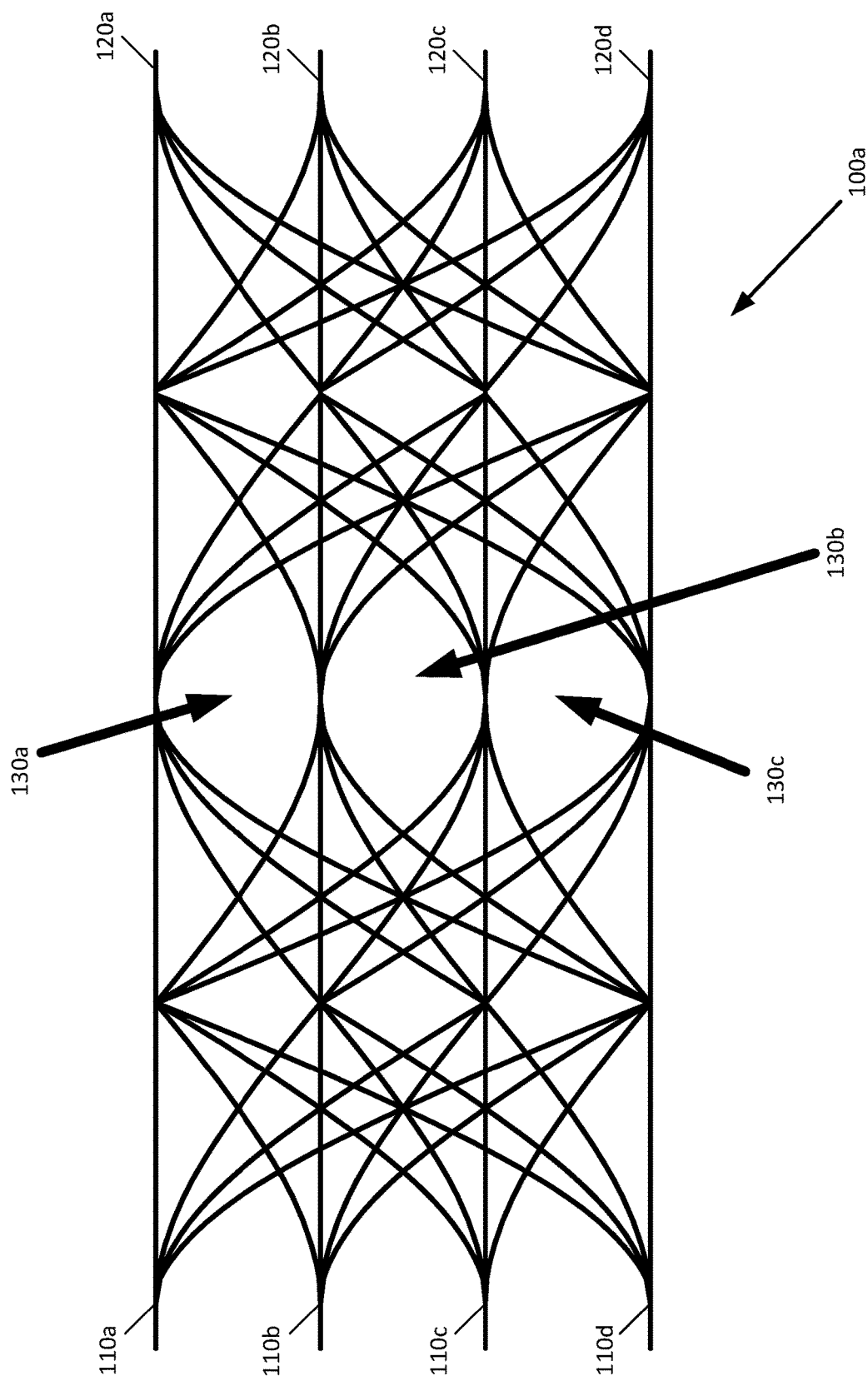
FIGS. 1A-1C illustrate multilevel signals with different spacing, according to embodiments of the present disclosure.

One embodiment presented in this disclosure provides a method for managing unequal spacing on multilevel signals, the method including: determining a dispersion slope of a channel between a transmitter and a receiver based on a temperature of the transmitter and a wavelength used by the transmitter to transmit signals over the channel; determining a maximum power and a minimum power for transmission over the channel; assigning a first rail to a first power level equal to the maximum power, a second rail to a second power level between the maximum power and the minimum power, a third rail to a third power level between the second power level and the minimum power, and a fourth rail to a fourth power level equal to the minimum power, wherein amplitude differences between the first, second, third, and fourth rails are based on the dispersion slope and produce a first eye pattern with a first RLM (Ratio of Level Mismatch) less than one; encoding, by the transmitter, data onto a conditioned signal according to the first, second, third, and fourth rails; and transmitting the conditioned signal from the transmitter to the receiver over the channel, wherein the conditioned signal as received demonstrates a second eye pattern with a second RLM greater than the first RLM.

One embodiment presented in this disclosure provides a method for managing unequal spacing on multilevel signals, the method including: sending, from a local transmitter, a first signal with a first known eye pattern and a second signal with a second known eye pattern, different from the first known eye pattern, to a remote receiver over a channel; sending temperature data of the local transmitter and operating wavelength data of the first signal and the second signal to the remote receiver over the channel; receiving, from the remote receiver, tuning parameters based on a dispersion of the channel based on a first difference between the first known eye pattern as transmitted and as received and a second difference between the second known eye pattern as transmitted and as received; and adjusting transmission rail values used to encode data for transmission over the channel by the local transmitter based on the tuning parameters to produce a conditioned signal for transmission with an unequally spaced eye pattern.

One embodiment presented in this disclosure provides a digital signal processing device enabled to manage unequal spacing on multilevel signals, the digital signal processing device including: a processor; and a memory storage device storing processor executable instructions that when executed by the processor, enable the processor to: determine a dispersion of a channel between a local transmitter and a remote receiver, based on a temperature of the local transmitter and a wavelength used by the local transmitter to transmit signals over the channel; determine a maximum power and a minimum power for transmission over the channel; assign a first rail to a first power level equal to the maximum power, a second rail to a second power level between the maximum power and the minimum power, a third rail to a third power level between the second power level and the minimum power, and a fourth rail to a fourth power level equal to the minimum power, wherein amplitude differences between the first power level and the second power level, the second power level and the third power level, and the third power level and the fourth power level are based on the dispersion and produce a first eye pattern with a first RLM (Ratio of Level Mismatch) less than one; encode, by the local transmitter, data onto a conditioned signal according to the first rail, the second rail, the third rail, and the fourth rail; and transmit the conditioned signal from the local transmitter to the remote receiver over the channel, wherein the conditioned signal as received demonstrates a second eye pattern with a second RLM greater than the first RLM.

Example Embodiments

As signal path characteristics can affect the reception of signals over long distances, the present disclosure provides for signal conditioning to counteract the signal path effects. A transmitter learns from a receiver the effects on the transmitted signal imparted by the signal path and adjusts how the multi-level signal is spaced at the time of transmission so that the multi-level signal is received with more even spacing at the receiver. The signal conditioning discussed herein adjusts the spacing of the transmitted signals to fully or partially counteract signal path effects on the signal so that the received signals are more evenly spaced and have a greater Signal to Noise Ratio (SNR).

Figure 1B:
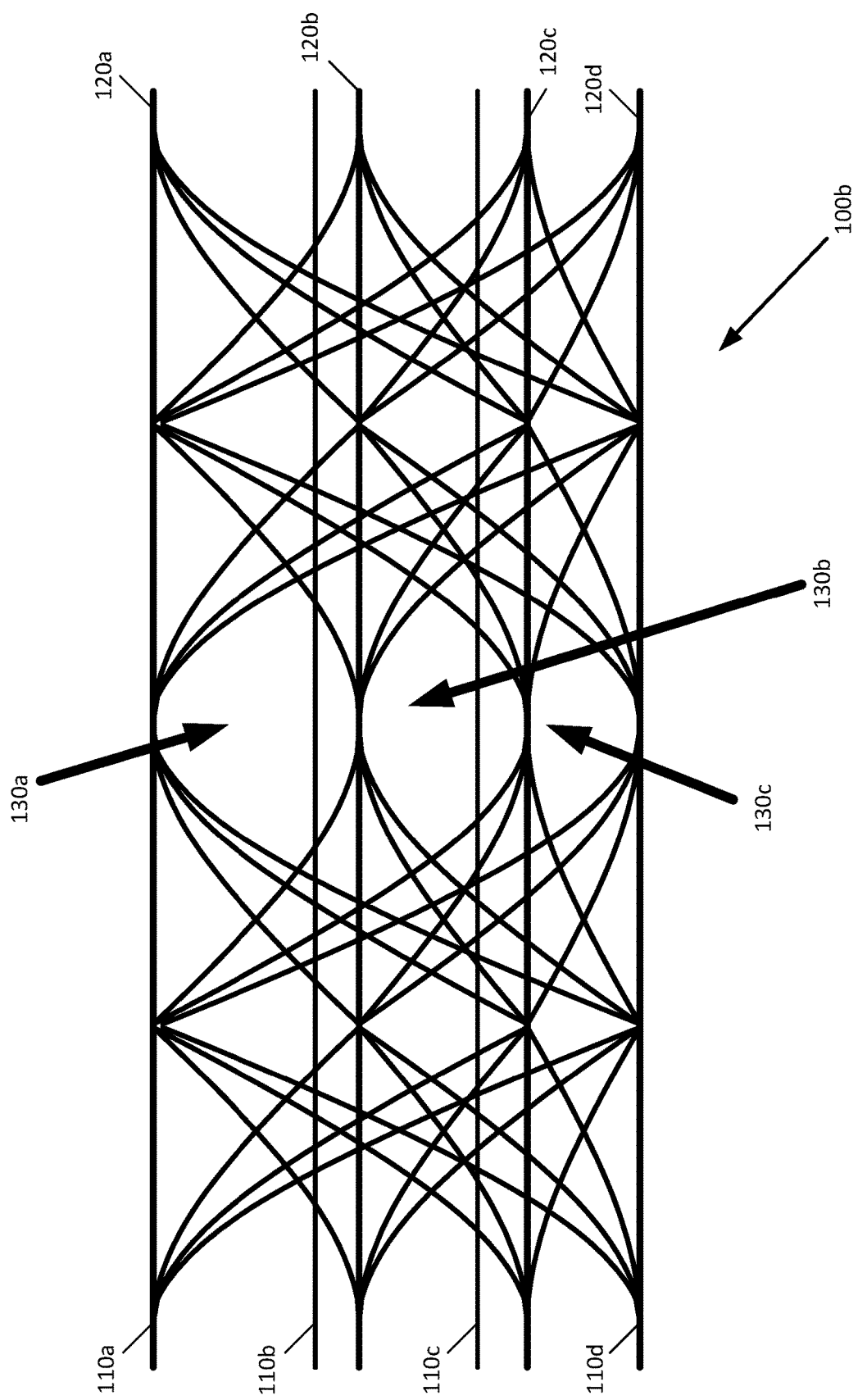
Figure 1C:
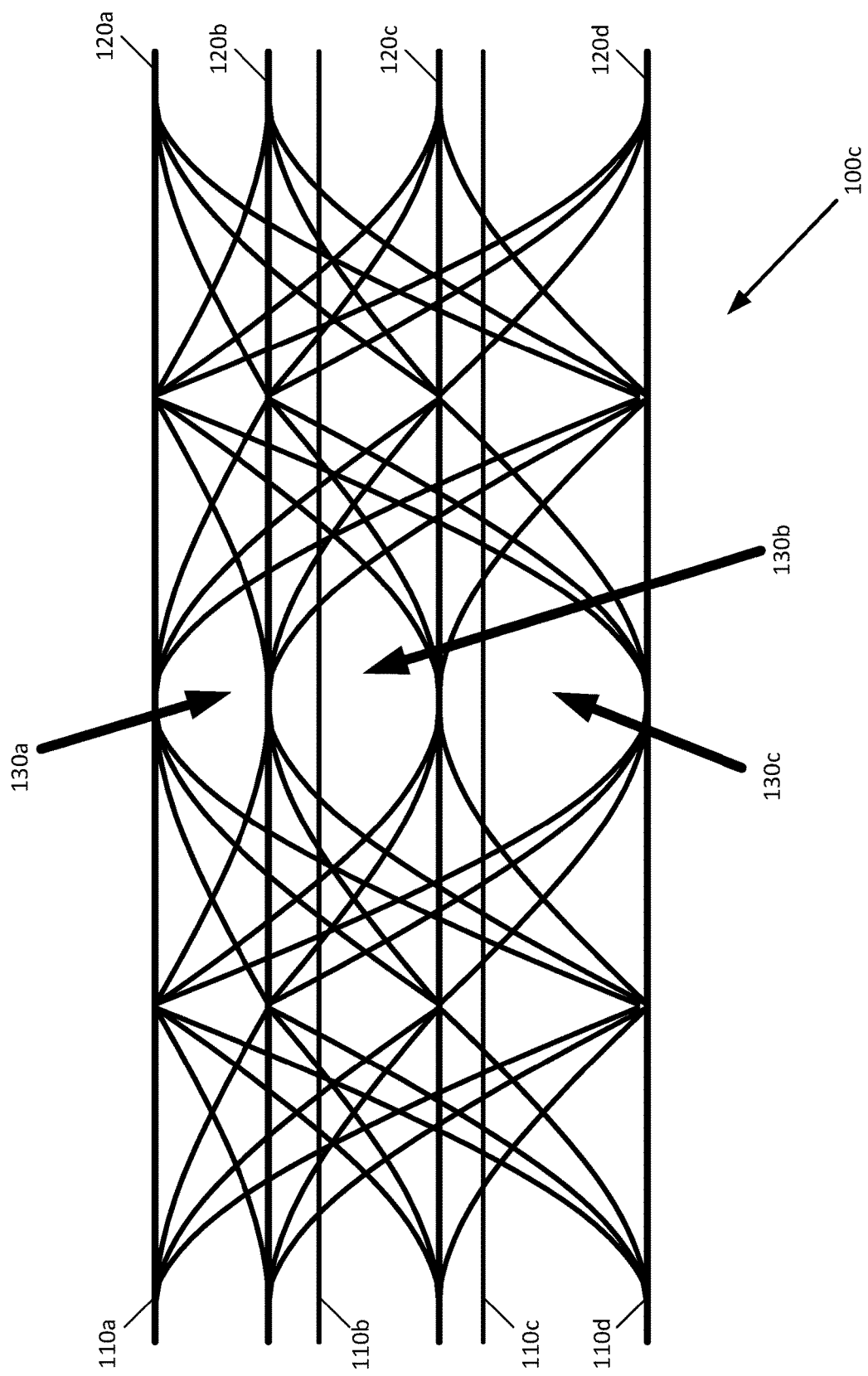

FIGS. 1A-1C illustrate various eye diagrams 100a-c (generally, eye diagram 100) for multi-level signals, according to embodiments of the present disclosure. FIG. 1A illustrates a first eye diagram 100a with even eye spacing, FIG. 1B illustrates a second eye diagram 100b with bottom compression, and FIG. 1C illustrates a third eye diagram 100c with top compression. Both FIGS. 1B and 1C illustrate examples of uneven spacing, although other uneven spacing effects are contemplated. An eye diagram 100 is a histogram that illustrates the amplitude of one or more signals (which may include the complements to those signals) that superimposes the amplitudes of those signals over a signaling interval to illustrate various channel effects on the signals based on the appearance and pattern of an "eye pattern" in the eye diagram 100. The illustrated eye diagrams 100a-c are for a Pulse Amplitude Modulation signal with four levels of pulse modulation (also referred to as PAM4) that include four transmission rails 110a-d (generally, transmission rail 110) and four received rails 120a-d (generally, received rail 120). In a PAM4 signal, gaps in the signals define three eyes 130a-c (generally, eye 130) whose relative amplitudes and positions to one another indicate the effects of noise, signal degradation, signal path interruption, synchronization, jitter, and the like. Although the examples given herein are primarily presented in relation to PAM4 signals, the present disclosure is applicable to transmissions with more two or more eyes in a respective eye diagram 100 (e.g., PAM8, PAM16, etc.).

A PAM4 signal can carry four potential values, corresponding to the four amplitudes that are set to the values of the transmission rails 110. For example, when evenly dividing the total signal amplitude of A between the first transmission rail 110a and the fourth transmission rail 110d, the first transmission rail 110a is set to A, the second transmission rail 110b is set to (⅔)A, the third transmission rail 110c is set to (⅓)A, and the fourth transmission rail 110d is set to 0. When a receiver receives a signal with sequential amplitudes of A, (⅔)A, (⅓)A, and 0 at sequential sampling times, the receiver determines that the signal sequentially encodes a first value (e.g., $11_{binary}$) a second value (e.g., $10_{binary}$), a third value (e.g., $01_{binary}$), and a fourth value (e.g., $00_{binary}$).

In a transmission with no chromatic dispersion, the values of the received rails 120 equal those of the transmission rails 11; however, in a chromatic dispersion environment, the values of the received rails 120 may drift from the values of the transmission rails 110. When a distance between two received rails 120 drifts to increase beyond one third of the total amplitude, at least one of the eyes 130 "expands" in the eye diagram 100. With a fixed amplitude A between the first transmission rail 110a and the fourth transmission rail 110d, an expansion of one eye 130 (e.g., an amplitude range greater than A/3) may result in the compression of two eyes 130 (e.g., amplitude ranges less than A/3), the compression of one eye 130 and shift in location of the other eye 130, or may be accompanied by the expansion of one eye 130 and compression of another eye 130. Having one or more eyes 130 compressed decreases the SNR for the compressed eyes 130 at the same noise on each levels, thus lowering the receiver's ability to distinguish between two values.

In the first eye diagram 100a in FIG. 1A, each eye 130 is evenly spaced; occupying one third of the total amplitude of the signals available between the first transmission rail 110a and the fourth transmission rail 110d. Accordingly, the received rails 120 match the transmission rails 110 and the size of the eyes 130 are equal to one another. Equally sized eyes 130 provide an even SNR in each of the eyes 130 and provide a receiver the greatest potential for distinguishing one value of a transmitted signal from another.

In the second eye diagram 100b in FIG. 1B, the first eye 130a occupies a greater portion of the total amplitude between the first transmission rail 120a and the fourth transmission rail 110d than is occupied by the second eye 130b or the third eye 130c. As a result, the amplitude different between the third received rail 120c and the fourth received rail 120d is less than ideal amplitude difference of (⅓)A between the third transmission rail 110c and the fourth transmission rail 110d. Accordingly, the illustrated second eye diagram 100b provides a lower SNR for the second eye 130b or the third eye 130c compared to the first eye 130a, and a receiver has less potential for distinguishing between the encoded values of the transmitted signal than if the eye diagram 100 were evenly spaced. Because the third eye 130c occupies a lower range of values for the measured signal amplitude (e.g., ideally from (⅓)A to 0), distortion the eye diagram 100 from the ideal state to a state with a smaller-than-ideal third eye 130c may be referred to as evidencing bottom compression.

In the third eye diagram 100c in FIG. 1C, the first eye 130a occupies a lesser portion of the total amplitude between the first transmission rail 120a and the fourth transmission rail 110d than is occupied by the second eye 130b or the third eye 130c. Accordingly, the illustrated third eye diagram 100c provides a lower SNR for the first eye 130a or the second eye 130b compared to the third eye 130c, and a receiver has less potential for distinguishing between the encoded values of the transmitted signal than if the eye diagram 100 were evenly spaced. Because the first eye 130a occupies an upper range of values for the measured signal amplitude (e.g., ideally from A to (⅔)A), distortion in an eye diagram 100 from the ideal state to a state with a smaller-than-ideal first eye 130a may be referred to as evidencing upper compression.

Each of the eye diagrams 100a-c illustrated in FIGS. 1A-1C may be described according to a ratio of level mismatch (RLM) defining a difference (i.e., a mismatch) between the ideal and measured powers of the signals. To calculate the RLM, the smallest difference between two received rails 120 is divided by the difference between the first transmission rail 110a and the fourth transmission rail 110d, and multiplied by three, according to Formula 1.

$$RLM = \frac{3 * \min(\Delta(\text{rail 1, rail 2}), \Delta(\text{rail 2, rail 3}), \Delta(\text{rail 3, rail 4}))}{\Delta(\text{rail 1, rail 4})} \quad (1)$$

Accordingly, an even eye pattern, such as in the first eye diagram 100a, yields an RLM=1, and an uneven or compressed eye pattern, such as in the second or third eye diagrams 100*b* or 100*c* yield an RLM<1, where greater compression yields a smaller RLM than lesser compression. As a convention, in the case of Δ(rail 3,rail 4)>Δ(rail 1,rail 2), the compression is defined to be "bottom compression" and takes negative sign, while in case of Δ(rail 3,rail 4)<Δ(rail 1,rail 2), the compression is defined to be "top compression" and keeps a positive sign. Each individual eye 130 in the eye diagrams 100 may also be described according to a ratio of power levels (RPL) that describes the relative difference in power between the received rails 120.

To overcome the compression on the eye pattern imposed by the channel between a transmitter and a receiver, the transmitter can alter where the transmission rails are set to thereby counteract the channel effects. The transmitter learns the channel effects from the receiver, and adjusts the transmitted eye pattern accordingly. For example, if the transmitter transmits a signal with an eye pattern matching the eye diagram in FIG. 1A, but the receiver receives the signal with an eye pattern matching the eye diagram in FIG. 1B (e.g., with bottom compression), the transmitter may transmit a signal with top compression/bottom expansion (such as in the third eye diagram 100*c*) so that the receiver receives an evenly spaced signal (such as in the first eye diagram 100*a*).

Figure 2:
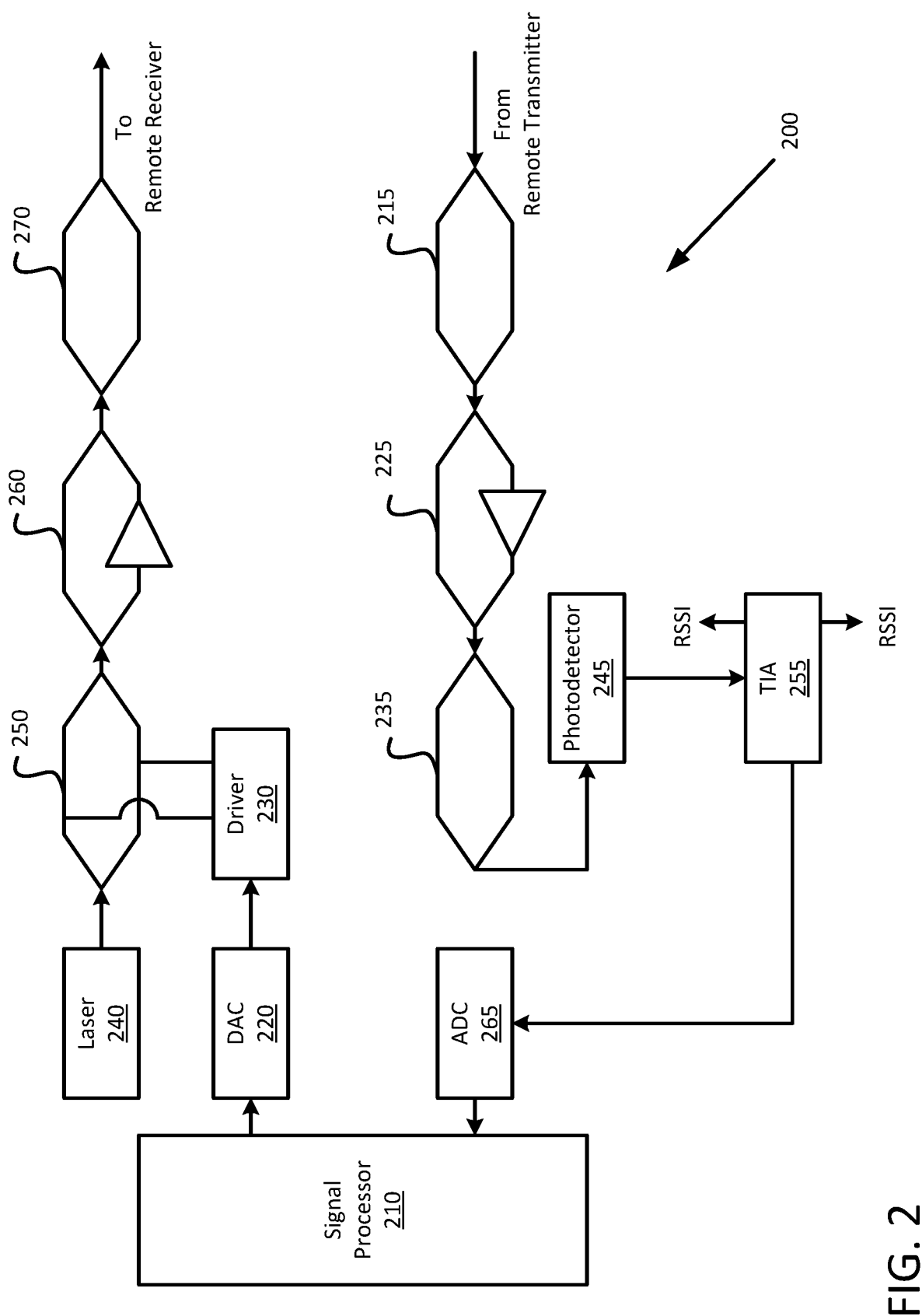
FIG. 2 illustrates a transceiver, as may be used to transmit and receive signals, according to embodiments of the present disclosure.

FIG. 2 illustrates a transceiver 200, as may be used to transmit and receive PAM4 signals, according to embodiments of the present disclosure. The transceiver 200 includes a signal processor 210, which may be a computing device, including a processor and memory device. The signal processor 210 includes a signal conditioner, which may be implemented in hardware (e.g., a microcontroller), software (e.g., processor executable instructions), firmware, and combinations thereof to generate, modify, interpret, and act on information included in a signal and to otherwise perform the methods described herein. The signal processor 210 sends and receives electrical signals, and various components of the transceiver 200 convert the electrical signals into optical signals for transmission to a remote receiver (e.g., receiving components of another transceiver 200), and convert optical signals received from a remote transmitted (e.g., transmitting components of another transceiver 200) into electrical signals for use by the signal processor 210.

The transmission components of the transceiver 200 include a Digital to Analog Converter (DAC) 220, which converts digital electrical signals from the signal processor 210 into analog electrical signals. The DAC 220 provides the analog electrical signals the driver 230, which controls a modulator 250 to modify the amplitude of the output of a laser 240. The transceiver 200 may adjust or tune the wavelength of the transmitted signal by controlling the temperature of the laser 240 and/or the temperature of the modulator 250 (e.g., via a heater or cooler integrated with the temperature controlled component).

The modulator 250 controls the relative amplitude of the light output by the laser 240 to encode the values carried on the electrical signals onto an optical signal for transmission. In various embodiments, driver 230 is tuned to encode various values carried on an electrical signal to different amplitudes of the optical signal. For example, in a PAM4 signal, the driver 230 may receive an electrical signal corresponding to encoded values of 0, 1, 2, or 3 (i.e., $00_{binary}$, $01_{binary}$, $10_{binary}$, and $11_{binary}$) and thereby control the modulator 250 to output a respective signal with amplitudes at each of four transmission rails 110 according to the corresponding encoded value. The driver 230 may be tuned to adjust what relative amplitude each transmission rail is set to, to thereby adjust the transmitted RLM of the signal.

When the driver 230 spaces each of the transmission rails 110 evenly (e.g., ⅓ of the total amplitude from adjacent rails), the eye pattern of the transmitted signal is even and the RLM is equal to 1. When the driver 230 spaces each of the transmission rails 110 unevenly (e.g., with at least one rail located less than ⅓ of the total amplitude an adjacent rails), the eye pattern of the transmitted signal is unequal and the RLM is less than to 1.

A transmitter Semiconductor Optical Amplifier (SOA) 260 is included to selectively amplify the optical signal from the modulator 250 by a fixed gain (e.g., when in an "active" or "on" mode) or without additional gain (e.g., when in a "bypass" or "off" mode) and a transmitter Variable Optical Amplifier (VOA) 270 is included to optionally apply a variable gain to the optical signal for transmission to a remote receiver. The transmitter SOA 260 and the transmitter VOA 270 selectively apply gains to the outbound optical signal so that the power of the optical signal is sufficiently high to overcome line attenuation between the transmitter and a remote receiver, but not so high as to experience non-linearities or gain induced noise that affects the ability of the remote receiver to interpret the optical signal. In various embodiments, the transmitter VOA is tuned to a gain based on the amplitude of signals output from the transmitter SOA 260 (whether in active or bypass mode) and the reflectivity of the channel to which the transmitter is connected, to thereby reduce back reflection or Brillouin scattering.

The reception components of the transceiver 200 include a first receiver VOA 215, a receiver SOA 225, and a second receiver VOA 235. The collective receiver amplifiers (215, 225, and 235) provide the received optical signal to a photodetector 245, such as a photodiode, which converts the optical signal into an electrical signal for the signal processor 210 to interpret. The receiver SOA 225 is included to selectively amplify the optical signal received from the remote transmitter by a fixed gain (e.g., when in an "active" or "on" mode) or without additional gain (e.g., when in a "bypass" or "off" mode). The first receiver VOA 215 optionally applies a variable gain to the received optical signal, which amplifies the received signal, and is tuned with respect to the operational range of the receiver SOA 225 to ensure the received signal is within the linear range of the receiver SOA 225. The second receiver VOA 235 optionally applies a variable gain to the received (and potentially amplified by the receiver SOA 225) optical signal, and is tuned with respect to the operational ranges of the photodetector 245 and transimpedance Amplifier (TIA) 255 to avoid introducing nonlinearities into the optical signal when converting the optical signal into an electrical signal. The photodetector 245 outputs an electrical signal based on the optical signal as an electrical current, and the TIA 255 converts the electrical current output from the photodetector 245 into a voltage difference, which is provided to an Analog to Digital Converter (ADC) 265. The ADC 265 converts the analog voltage-based electrical signal into a digital electrical signal for consumption by the signal processor 210.

Figure 3:
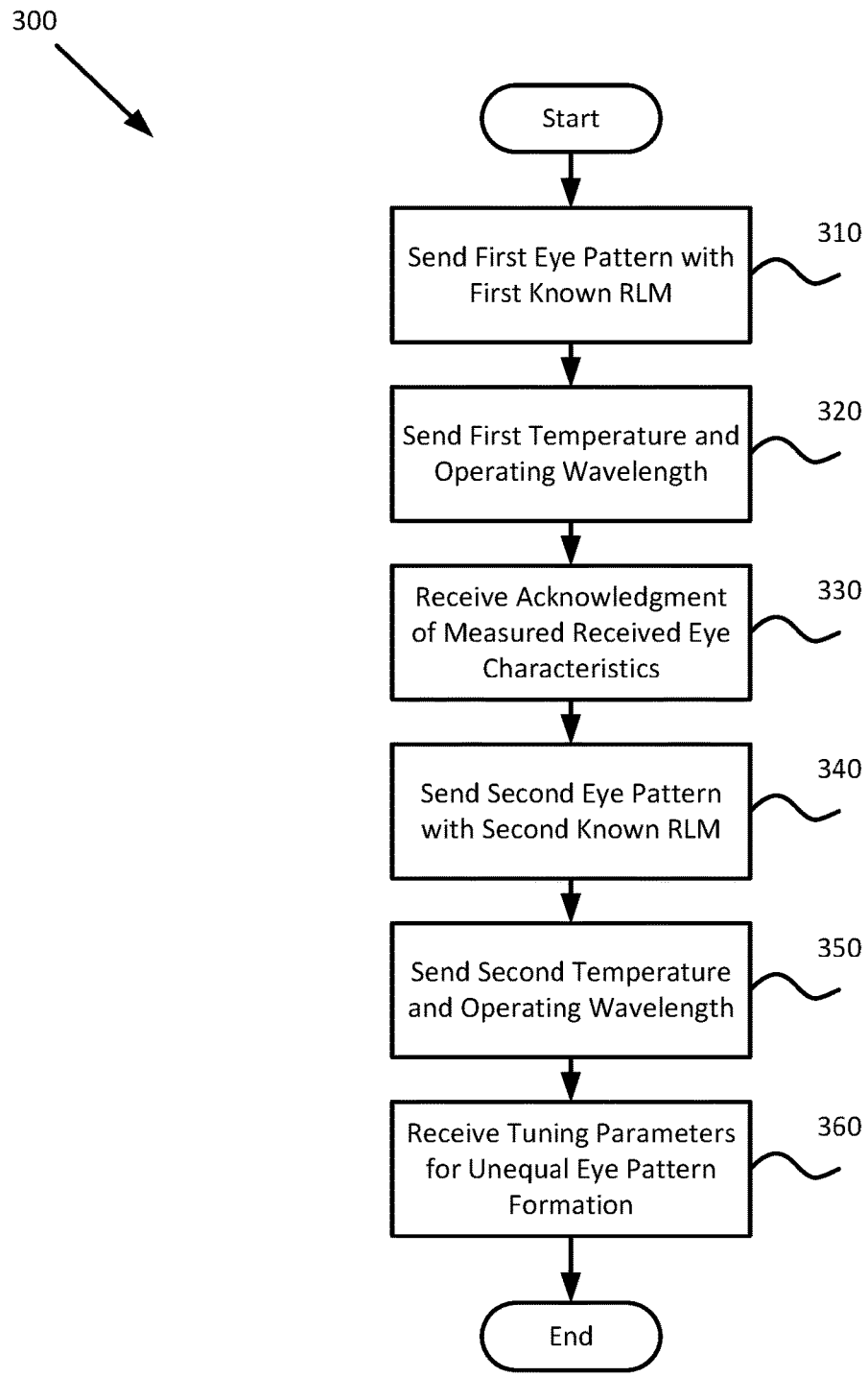
FIG. 3 a flowchart of a method for determining a dispersion slope of the channel between a local transmitter and a remote receiver, according to embodiments of the present disclosure.

FIG. 3 is a flowchart of a method 300 for determining a dispersion slope of the channel between a local transmitter and a remote receiver. Method 300 begins at block 310, where the transmitter sends to the receiver over the channel, a first signal with a first known eye pattern. In various embodiments, the first known eye pattern exhibits an RLM of 1 at transmission, but exhibits an RLM less than 1 on receipt at the receiver due to dispersion effects and attenuation effects over the length of the channel. In other embodiments, the first eye pattern may exhibit any predefined RLM.

The effects of the channel on signals carried thereon may vary as the temperature of the transmitter varies, or as different wavelengths of optical signals are used to communicate over the channel. Therefore, at block 320, the transmitter sends a first set of temperature and wavelength data to the receiver that identify the operational temperature of the transmitter when sending the first signal, and the wavelength of the first signal.

At block 330, a local receiver associated with the local transmitter (e.g., in a transceiver 200, such as in FIG. 2) receives acknowledgement from a remote transmitter associated with the remote receiver (e.g., in a transceiver 200, such as in FIG. 2) that indicate that the remote receiver has successfully received and processed the first signal and first data set, and is ready to receive a second signal and second data set.

At block 340, the transmitter sends to the receiver over the channel, a second signal with a second known eye pattern, with a different RLM than used for the first known eye pattern. The transmitter tunes the transmitting laser by a predefined amount (e.g., 2 nanometers) to transmit the second signal on different wavelength than the first signal. Similarly to the first known eye pattern, the second known eye pattern exhibits an initial RLM of a predefined value at transmission, but exhibits a different (and initially unknown) RLM on receipt at the receiver due to dispersion effects and attenuation effects over the length of the channel. After transmitting the second eye pattern, method 300 proceeds to block 350, where the transmitter sends a second set of temperature and wavelength data to the receiver that identify the operational temperature of the transmitter when sending the second signal, and the wavelength of the second signal.

In embodiments in which the bandwidth of the channel is divided in a wavelength division multiplexing schema by the transmitter and the receiver, blocks 310 and block 340 may be performed simultaneously when the first and second signals are sent to separate channels at different wavelengths, block 320 and block 350 may be performed simultaneously using the separate channels to transmit the related temperature and wavelength data for the eye-patterned signals transmitted thereon, and block 330 may be omitted.

The receiver uses the received first and second signals and wavelength data to calculate a change in RLM from the known RLMs of the transmitted signals (sent at block 310 and 340) to the RLMs of the received signals as affected by the channel effects exhibited over the length of the channel. The receiver calculates a dispersion slope for the channel using an average drift coefficient for the channel, the temperature data, and the RLM change, and uses the dispersion slope to develop tuning parameter for how the transmitter forms an unequal eye pattern for transmission over the channel.

The dispersion slope correlates the changes in RLM from transmission to reception across wavelengths. The dispersion slope for the change in RLM as a function of wavelength can be calculated as indicated in Formula 2 below, where $\lambda_1$ and $\lambda_2$ are the wavelengths of the first and second signals respectively, and $RLM_{Tx}$ is the RLM of the signal as transmitted and $RLM_{Rx}$ is the RLM of the signal as received for the indicated wavelength.

$$\text{Slope}_{Dispersion} = \frac{(RLM_{Tx} - RLM_{Rx})_{\lambda_2} - (RLM_{Tx} - RLM_{Rx})_{\lambda_1}}{\lambda_2 - \lambda_1} \quad (2)$$

Using the dispersion slope (e.g., indicating ΔRLM per nanometer), the desired $RLM_{Rx}=1$, and a known wavelength $\lambda$ for transmitting the signal, the receiver determines the desired $RLM_{Tx}$ for the transmitter according to Formula 3, where D is the drift coefficient for the laser transmitting the signal, and T is the temperature of the transmitter.

$$RLM_{Tx\text{-}desired} = \text{Slope}_{Dispersion} * \lambda + D * T - 1 \quad (3)$$

The receiver determines tuning parameters to define transmission rails that exhibit an eye pattern that produces the desired RLMTx, where a positive value (following the convention described in relation to Formula 1) for $RLM_{Tx\text{-}desired}$ indicates top compression is to be applied to achieve the desired $RLM_{Tx}$, and a negative value for $RLM_{Tx\text{-}desired}$ indicates bottom compression is to be applied to achieve the desired $RLM_{Tx}$.

At block 360, the local transmitter receives the tuning parameters from the remote receiver for unequal eye pattern formation. The tuning parameters specify the relative positions of the transmission rails used to encode data for transmission on a signal as close as possible to the 0-dispersion wavelength of the channel. For example, the tuning parameters respectively set the first transmission rail 110a and the fourth transmission rail 110d to the maximum and minimum amplitude values of the transmitted signal, but set the second transmission rail 110b and the third transmission rail 110c to positions other than ⅔ and ⅓ of the difference between the amplitude maxima and minima so that the signal as transmitted exhibits eye compression (i.e., an RLM<1). The particular values for the second transmission rail 110b and the third transmission rail 110c are selected based on the dispersion slope for the channel so that the second received rail 120b and the third received rail 120c define levels as close as possible to ⅓ of the total signal amplitude as received. Stated differently, the unequal spacing of the eye pattern at transmission is selected so that the received signal is equally spaced.

Accordingly, the local transmitter may condition the signal when encoding data for transmission onto the transmission rails 110 as tuned by the tuning parameters and the remote receiver will receive the signal with a more equal spacing in the eye pattern (i.e., with a received RLM closer to 1 than the transmitted RLM). Method 300 may then conclude.

Figure 4:
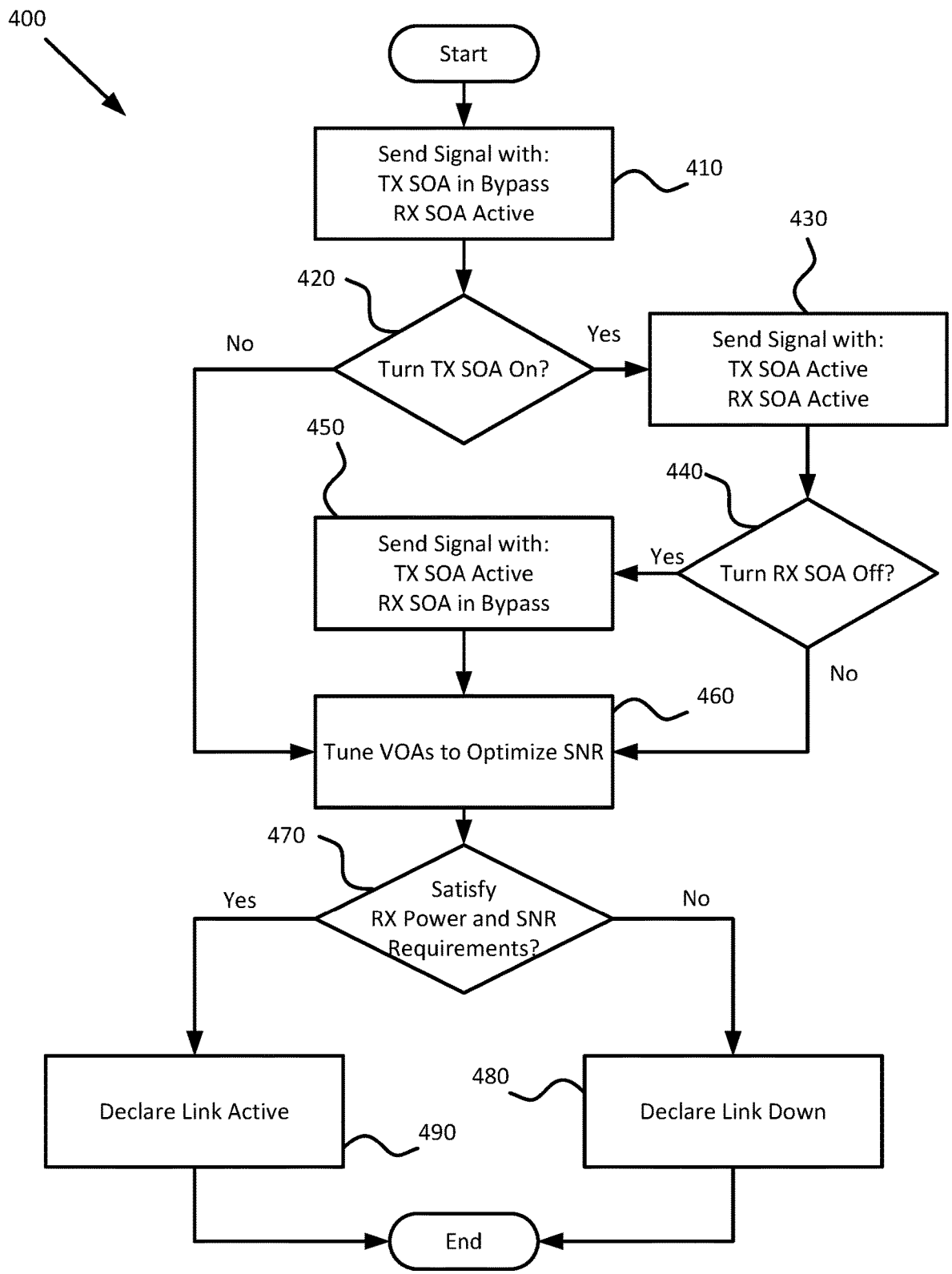
FIG. 4 is a flowchart of a method for determining a power for transmitting a signal over a channel, according to embodiments of the present disclosure.

FIG. 4 is a flowchart of a method 400 for determining a power for transmitting a signal over a channel. Method 400 tunes one or more amplifiers of a transmitter and a receiver on opposite ends of the channel so that signals transmitted over the channel can be interpreted according to a received power requirement, and that the received power and the SNR for the signal are robust. Method 400 may be performed in conjunction with method 300 to determine the power levels to use in conjunction with the unequally spaced eye pattern to further improve the SNR of the transmitted signal. The receiver identifies if one or none of the potential combinations of bypass/active modes for the receiver SOA and the transmitter SOA satisfy a received power requirement and communicates the selected mode to the transmitter so that future signals are sent according to the selected mode.

Method 400 begins with block 410, where the transmitter sends a first signal when the transmitter SOA is in bypass mode and the receiver SOA is set in active mode.

At block 420, the receiver evaluates whether to instruct the transmitter to set the transmitter SOA into active mode based on the SNR ratio in the received first signal and/or the power level of the first signal as received. When the SNR and/or power level are below a preset threshold, the receiver instructs the transmitter to turn on the transmitter SOA, and method 400 proceeds to block 430. When the SNR and/or power level are at or above a preset threshold, method 400 proceeds to block 460 without the receiver signaling the transmitter to turn of the transmitter SOA.

At block 430, the transmitter sends a second signal when the transmitter SOA is set in active mode and the receiver SOA is set in active mode.

At block 440, the receiver evaluates whether to set the receiver SOA into bypass mode based on the SNR ratio in the received first or second signals and/or the power level of the first or second signals as received. When the received signals exhibit signs of non-linearities affecting the SNR due to the signal being received with too high of a power level, the receiver determines to turn off the receiver SOA, and method 400 proceeds to block 450. Otherwise, the receiver leaves the receiver SOA is active mode, and method 400 proceeds to block 460.

At block 450, the transmitter sends a third signal when the transmitter SOA is set in active mode and the receiver SOA is set in bypass mode.

In various embodiments, block 410-450 may be performed with the different transmitter/receiver settings tested in the indicated block to evaluate the mode combinations in a different order. In other embodiments, the receiver may walk through each of the block 410-450 to evaluate all of the potential combinations of SOA modes and select the SOA mode combination with the highest SNR or satisfy the received power requirement by the largest margin.

In some embodiments, the first signal (per block 410), the second signal (per block 430), and the third signal (per block 450) are transmitted with known eye patterns having different predefined RLM values at transmission, and may be used to calculate the unequal eye level spacing per method 300.

At block 460, the receiver tunes the VOAs in the transmitter and the receiver to optimize the SNR of the signal as received. The receiver may tune a transmitter VOA to adjust output from the transmitter SOA onto the channel to reduce back reflection from the channel onto the transmitter. The receiver may also tune a first receiver VOA to adjust the amplitude of input to the receiver SOA from the channel based on the linear operating range of the receiver SOA to avoid introducing nonlinearities to the signal. Additionally, the receiver may tune a second receiver VOA to adjust the output from the receiver SOA according to the operating ranges of a photodetector and a TIA in the receiver to avoid introducing further linearities when converting the optical signal into a voltage-based electrical signal.

At block 470, the receiver evaluates whether the tuned SOA and VOA amplifiers can produce a signal that satisfies the power and SNR requirements for the receiver. In response to determining that none of the mode combinations, eye pattern spacing parameters (per method 300), and VOA tuning parameter satisfy the receiver power and SNR requirements, method 400 proceeds to block 480, where the receiver declares the link to the transmitter to be down, and the transmitter is not permitted to begin communicating with the receiver. In response to determining that one of the mode combinations, eye pattern spacing parameters (per method 300), and VOA tuning parameter satisfy the receiver power and SNR requirements, method 400 proceeds to block 490, where the receiver declares the link to the transmitter active, and the transmitter is permitted to begin communicating with the receiver. Method 400 may conclude after block 480 or block 490.

Figure 5:
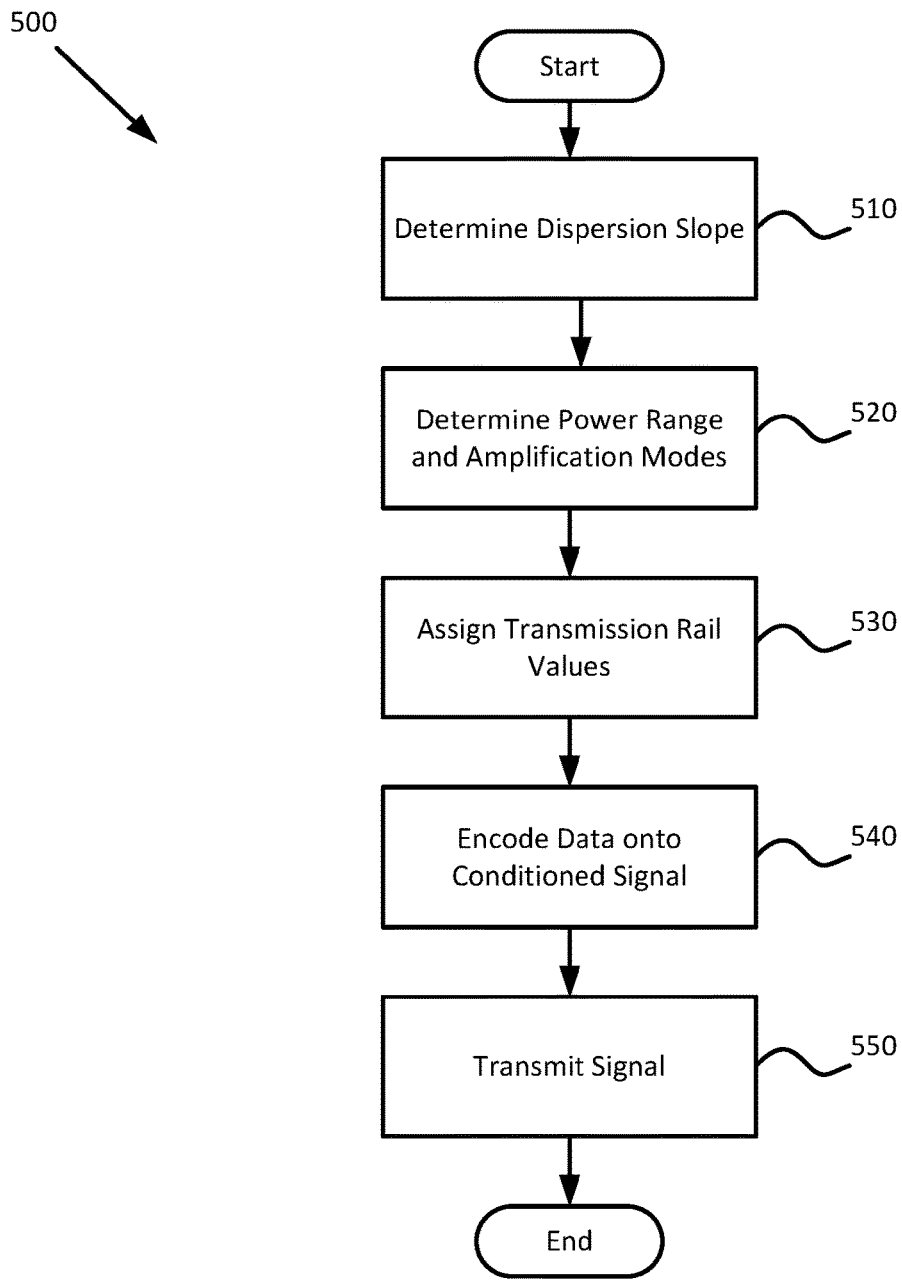
FIG. 5 is a flowchart of a method for conditioning a signal for transmission over a channel, according to embodiments of the present disclosure.

FIG. 5 is a flowchart of a method 500 for conditioning a signal for transmission over a channel. Method 500 begins with block 510, where a transmitter and a receiver communicate over the channel for the receiver to determine a dispersion slope of the channel between the transmitter and receiver based on a temperature of the transmitter and wavelengths used by the transmitter to transmit signals over the channel. The transmitter sends, to the receiver, a first signal with a first known eye pattern and a second signal with a second known eye pattern and temperature data of the transmitter and operating wavelength data. Using the received data, the receiver calculates the dispersion slope of the channel based on a first difference between the first known eye pattern as transmitted and as received, and a second difference between the second known eye pattern as transmitted and as received and the respective wavelengths of the first and second signals to determine the dispersion slope. In various embodiments, block 510 may be performed as is described in method 300, discussed in relation to FIG. 3. The receiver transmits the dispersion slope to the transmitter for the transmitter to tune itself accordingly to produce signals with reduced dispersion and improved SNR characteristics.

At block 520, the receiver determines a maximum power and a minimum power for transmission over the channel, including amplification modes for the transmitter and receiver to achieve the power range to establish an active link. In various embodiments, the ranges for the maxima and minima are defined in a transmission specification, but the receiver determines what amplitude ranges and amplifier settings to use on the transmitter and at the receiver, such as, for example, performed as is described in method 400, discussed in relation to FIG. 4. The transmitter sends up to three signals with different modes of operation for the SOAs of the transmitter and the receiver (e.g., transmitter SOA bypass and receiver SOA active, transmitter SOA active and receiver SOA active, and transmitter SOA active and receiver SOA bypass). In various embodiments, the receiver determines one of the mode combinations that produces signals that satisfy a receiver power requirement and provide the greatest SNR, and sets the amplifiers on the receiver and the transmitter to those modes. Additionally, the receiver may tune one or more VOAs on the receiver and the transmitter to further optimize the SNR with the chose modes of operation for the SOAs. In other embodiments, when the receiver determines that none of the mode combinations produce signals that satisfy the receiver power requirement and provide an SNR that satisfies a receiver SNR requirement, the receiver may declare the link over the channel from the transmitter to be down.

In embodiments not using amplification or when the SOAs of the transmitter and receiver are both set to bypass mode, block 520 may be omitted, and the power range of the communication specification or schema used by the transmitter and receiver can define the maximum and minimum powers for transmission.

At block 530, the transmitter assigns transmission rail values for the signals to various power levels based on the dispersion slope (determined per block 510) and the power range (determined per block 520). The power range defines the maximum and minimum power levels for the transmission rails (e.g., the first and fourth transmission rails 110a, 110d in a PAM4 signal as in FIG. 1A), and the dispersion slope defines the eye pattern (and thereby the power levels for the transmission rails) for the signal.

At block 540, the transmitter encodes data onto the signal as conditioned to produce the unequally space eye pattern defined in block 530. In a PAM embodiment, the transmitter encodes a first value to the first transmission rail, a second value to the second transmission rail, etc., so that an nth value is assigned to the nth transmission rail. The amplitude differences between the transmission rails, rather than being divided evenly into segments of A/n−1 power over the amplitude range A, are instead divided unevenly to compress the top or the bottom eye to counteract the bottom or top compression applied by the channel between the transmitter and the receiver. Accordingly the transmitter produces and eye pattern with an RLM less than one.

At block 550, the transmitter transmits the conditioned signal over the channel to the receiver. As the signal is conditioned to counteract the signal compression characteristics of the channel, the receiver receives the signal with an RLM greater than the transmitted RLM (i.e., an RLM closer to one, indicative of a more-even eye pattern). Accordingly, the unequally spaced eyes of the conditioned signals improve the SNR for communications from the transmitter to the receiver over the channel. Method 500 may then conclude.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining a dispersion slope of a channel between a transmitter and a receiver based on a temperature of the transmitter and a wavelength used by the transmitter to transmit signals over the channel;
   determining a maximum power and a minimum power for transmission over the channel;
   assigning a first rail to a first power level equal to the maximum power, a second rail to a second power level between the maximum power and the minimum power, a third rail to a third power level between the second power level and the minimum power, and a fourth rail to a fourth power level equal to the minimum power, wherein amplitude differences between the first, second, third, and fourth rails are based on the dispersion slope and produce a first eye pattern with a first Ratio of Level Mismatch (RLM) less than one;
   encoding, by the transmitter, data onto a conditioned signal according to the first, second, third, and fourth rails; and
   transmitting the conditioned signal from the transmitter to the receiver over the channel, so that the conditioned signal demonstrates a second eye pattern with a second RLM greater than the first RLM when received at the receiver.

2. The method of claim 1, wherein determining the maximum power and the minimum power further comprises:
   sending, by the transmitter having a transmitter Silicon Optical Amplifier (SOA) set in bypass mode, a first optical signal over the channel to the receiver having a receiver SOA set in active mode;
   sending, by the transmitter with the transmitter SOA set in active mode, a second optical signal over the channel to the receiver with the receiver SOA set in active mode;
   sending, by the transmitter with the transmitter SOA set in active mode, a third optical signal over the channel to the receiver with the receiver SOA set in bypass mode; and
   in response to identifying one of the first optical signal, the second optical signal, and the third optical signal as satisfying a received power requirement for the receiver, setting the transmitter SOA and the receiver SOA according to modes used in transmitting the identified one of the first optical signal, the second optical signal, and the third optical signal.

3. The method of claim 2, further comprising:
   in response to determining that none of the optical first signal, the second optical signal, and the third optical signal satisfy the received power requirement, declaring a link between the transmitter and the receiver over the channel to be down.

4. The method of claim 2, further comprising:
   tuning a transmitter VOA (Variable Optical Amplifier) to adjust output from the transmitter SOA to reduce back reflection from the channel onto the transmitter;
   tuning a first receiver VOA in the receiver to adjust input to the receiver SOA from the channel according to a linear operating range of the receiver SOA; and
   tuning a second receiver VOA to adjust output from the receiver SOA according to an operating ranges of a photodetector and a transimpedance amplifier in the receiver.

5. The method of claim 1, wherein determining the dispersion slope further comprises:
   sending, from the transmitter to the receiver over the channel, a first signal with a first known eye pattern and a second signal with a second known eye pattern;
   sending temperature data of the transmitter and operating wavelength data to the receiver over the channel; and
   calculating the dispersion slope of the channel based a first difference between the first known eye pattern as transmitted and the first known eye pattern as received and a second difference between the second known eye pattern as transmitted and the second known eye pattern as received.

6. The method of claim 1, wherein the conditioned signal is amplified such that the second eye pattern as measured by the receiver includes:
   a first received rail, that matches the maximum power;
   a second received rail, that matches ⅔ of a difference between the maximum power and the minimum power;
   a third received rail, that matches ⅓ of the difference between the maximum power and the minimum power; and
   a fourth received rail, that matches the minimum power.

7. A method, comprising:
   sending, from a local transmitter, a first signal with a first known eye pattern and a second signal with a second known eye pattern, different from the first known eye pattern, to a remote receiver over a channel;
   sending temperature data of the local transmitter and operating wavelength data of the first signal and the second signal to the remote receiver over the channel;
   receiving, from the remote receiver, tuning parameters based on a dispersion of the channel based on a first difference between the first known eye pattern as transmitted and as received and a second difference between the second known eye pattern as transmitted and as received; and
   adjusting transmission rail values used to encode data for transmission over the channel by the local transmitter based on the tuning parameters to produce a conditioned signal for transmission with an unequally spaced eye pattern.

8. The method of claim 7, the first known eye pattern is transmitted with a first Ratio of Level Mismatch (RLM) set to one and the second known eye pattern is transmitted with a second RLM set to a predefined value less than one.

9. The method of claim 8, further comprising:
   sending, from the local transmitter to the remote receiver over the channel, a third signal with a third known eye pattern set according to the tuning parameters to have a third RLM at transmission that is less than one and a fourth RLM on receipt with a value closer to one than the third RLM.

10. The method of claim 7, wherein the first signal and the second signal are pulse amplitude modulated signals with four levels.

11. The method of claim 10, wherein the tuning parameters specify:
    a first transmission rail, set to a first power level equal to a maximum power for a given signal;
    a second transmission rail, set to a second power level between the maximum power and a minimum power for the given signal;
    a third transmission rail, set to a third power level between the second power level and the minimum power; and
    a fourth transmission rail, set to a fourth power level equal to the minimum power;

wherein a first amplitude difference between the first power level and the second power level is different from a second amplitude difference between the second power level and the third power level and is different from a third amplitude difference between the third power level and the fourth power level; and wherein the second amplitude difference is different from the third amplitude difference.

12. The method of claim 7, wherein the first signal has a first known wavelength and wherein the second signal is sent after the first signal is received by the remote receiver and has a second known wavelength different than the first known wavelength.

13. The method of claim 7, wherein wavelength division multiplexing is used over the channel, wherein the first signal and the second signal are transmitted simultaneously, wherein the first signal and the second signal are transmitted at different known wavelengths.

14. The method of claim 7, further comprising:
tuning a first amplitude of the conditioned signal as transmitted onto the channel to reduce back reflection from the channel onto the local transmitter; and
instructing the remote receiver to tune a second amplitude of the conditioned signal as received at the remote receiver to reduce nonlinearities in decoding the data encoded for transmission as received.

15. A digital signal processing device, comprising:
a processor; and
a memory storage device storing processor executable instructions that when executed by the processor, enable the processor to:
determine a dispersion of a channel between a local transmitter and a remote receiver, based on a temperature of the local transmitter and a wavelength used by the local transmitter to transmit signals over the channel;
determine a maximum power and a minimum power for transmission over the channel;
assign a first rail to a first power level equal to the maximum power, a second rail to a second power level between the maximum power and the minimum power, a third rail to a third power level between the second power level and the minimum power, and a fourth rail to a fourth power level equal to the minimum power, wherein amplitude differences between the first power level and the second power level, the second power level and the third power level, and the third power level and the fourth power level are based on the dispersion and produce a first eye pattern with a first Ratio of Level Mismatch (RLM) less than one;
encode, by the local transmitter, data onto a conditioned signal according to the first rail, the second rail, the third rail, and the fourth rail; and
transmit the conditioned signal from the local transmitter to the remote receiver over the channel, so that the conditioned signal demonstrates a second eye pattern with a second RLM greater than the first RLM when received at the receiver.

16. The digital signal processing device of claim 15, wherein to determine the maximum power and the minimum power further, the processor executable instructions, when executed by the processor, further enable the processor to:

send, by the local transmitter when a transmitter Silicon Optical Amplifier (SOA) is set in bypass mode, a first optical signal over the channel to the remote receiver when a receiver SOA is set in active mode;
send, by the local transmitter when the transmitter SOA is set in active mode, a second optical signal over the channel to the remote receiver when the receiver SOA is set in active mode;
send, by the local transmitter when the transmitter SOA is set in active mode, a third optical signal over the channel to the remote receiver when the receiver SOA is set in bypass mode; and
in response to identifying one of the first optical signal, the second optical signal, and the third optical signal as satisfying a received power requirement for the remote receiver, set the transmitter SOA to a mode used in transmitting the identified one of the first optical signal, the second optical signal, and the third optical signal.

17. The digital signal processing device of claim 16, wherein the processor executable instructions, when executed by the processor, further enable the processor to:
in response to determining that none of the first optical signal, the second optical signal, and the third optical signal satisfy the received power requirement, declare a link between the local transmitter and the remote receiver over the channel to be down.

18. The digital signal processing device of claim 16, wherein the processor executable instructions, when executed by the processor, further enable the processor to:
tune a transmitter Variable Optical Amplifier (VOA) to adjust output from the transmitter SOA to reduce back reflection from the channel onto the local transmitter.

19. The digital signal processing device of claim 15, wherein to determine the dispersion, the processor executable instructions, when executed by the processor, further enable the processor to:
send, from the local transmitter to the remote receiver over the channel, a first signal with a first known eye pattern and a second signal with a second known eye pattern;
send temperature data of the local transmitter and operating wavelength data to the remote receiver over the channel; and
receive, from the remote receiver, a calculation of the dispersion of the channel based on a first difference between the first known eye pattern as transmitted and the first known eye pattern as received and a second difference between the second known eye pattern as transmitted and the second known eye pattern as received.

20. The digital signal processing device of claim 15, wherein the conditioned signal is amplified such that the second eye pattern as measured by the remote receiver includes:
a first received rail, that matches the maximum power;
a second received rail, that matches ⅔ of a difference between the maximum power and the minimum power;
a third received rail, that matches ⅓ of the difference between the maximum power and the minimum power; and
a fourth received rail, that matches the minimum power.

* * * * *